US011604931B2

(12) United States Patent
Yoon et al.

(10) Patent No.: US 11,604,931 B2
(45) Date of Patent: Mar. 14, 2023

(54) ELECTRONIC DEVICE AND CONTROLLING METHOD OF ELECTRONIC DEVICE

(71) Applicant: Samsung Electronics Co., Ltd., Suwon-si (KR)

(72) Inventors: Yoonjin Yoon, Suwon-si (KR); Yoonjung Choi, Suwon-si (KR); Indong Lee, Suwon-si (KR); Hyojung Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 17/030,934

(22) Filed: Sep. 24, 2020

(65) Prior Publication Data

US 2021/0097242 A1    Apr. 1, 2021

(30) Foreign Application Priority Data

Sep. 27, 2019  (KR) .......................... 10-2019-0119791

(51) Int. Cl.
  *G06F 40/58*  (2020.01)
  *G06F 40/44*  (2020.01)
  *G06F 40/47*  (2020.01)
(52) U.S. Cl.
  CPC .............. *G06F 40/58* (2020.01); *G06F 40/44* (2020.01); *G06F 40/47* (2020.01)
(58) Field of Classification Search
  CPC ....................................................... G06F 40/58
  See application file for complete search history.

(56) References Cited

U.S. PATENT DOCUMENTS 7,912,696 B1   3/2011  Asano et al.
8,214,196 B2   7/2012  Yamada et al.
(Continued)

FOREIGN PATENT DOCUMENTS

CN   105975558 A  *  9/2016  ........... G06F 16/951
JP   H07-122876 B2  12/1995
(Continued)

OTHER PUBLICATIONS

A. Mandal et al., "Efficient data selection for machine translation," 2008 IEEE Spoken Language Technology Workshop, 2008, pp. 261-264, doi: 10.1109/SLT.2008.4777890. (Year: 2008).*
(Continued)

*Primary Examiner* — Richemond Dorvil
*Assistant Examiner* — Alexander G Marlow
(74) *Attorney, Agent, or Firm* — Jefferson IP Law, LLP

(57) ABSTRACT

An electronic device is provided. The electronic device includes a memory and a processor. The processor is configured to, based on acquiring a first sentence in a first language, determine whether to correct the first sentence to another sentence in the first language by using a second language model trained based on a learning corpus, and based on determining to correct the first sentence to another sentence in the first language, input the first sentence into a conversion model trained to acquire another sentence having a similarity greater than or equal to a threshold value to an input sentence and acquire a second sentence in the first language which is a corrected form of the first sentence, and based on acquiring the second sentence, input the second sentence into a translation model trained based on the learning corpus and acquire a third sentence in a second language.

20 Claims, 9 Drawing Sheets

(56) References Cited

U.S. PATENT DOCUMENTS

| | | |
|---|---|---|
| 10,713,439 B2 | 7/2020 | Lee et al. |
| 10,902,216 B2 | 1/2021 | Lee et al. |
| 11,093,719 B2 | 8/2021 | Lee et al. |
| 2013/0132064 A1 | 5/2013 | Hwang et al. |
| 2017/0323203 A1 | 11/2017 | Matusov et al. |
| 2018/0046618 A1 | 2/2018 | Lee et al. |
| 2018/0052829 A1 | 2/2018 | Lee |
| 2018/0089169 A1* | 3/2018 | Yamauchi ............ G06F 40/247 |
| 2018/0121419 A1 | 5/2018 | Lee et al. |
| 2018/0357224 A1* | 12/2018 | Yamauchi ............ G06F 40/47 |
| 2019/0251174 A1 | 8/2019 | Lee et al. |
| 2020/0401768 A1* | 12/2020 | Freeman ............ G06F 40/30 |

FOREIGN PATENT DOCUMENTS

| | | |
|---|---|---|
| KR | 10-2001-0031659 A | 4/2001 |
| KR | 10-2013-0102926 A | 9/2013 |
| KR | 10-1670995 B1 | 10/2016 |
| KR | 10-2018-0017622 A | 2/2018 |
| KR | 10-1818598 B1 | 3/2018 |
| KR | 10-2018-0047409 A | 5/2018 |
| KR | 10-2019-0097629 A | 8/2019 |
| WO | WO-2019085779 A1 * | 5/2019 ............ G06F 17/22 |

OTHER PUBLICATIONS

Sennrich, Perplexity Minimization for Translation Model Domain Adaptation in Statistical Machine Translation, Proceedings of the 13th Conference of the European Chapter of the Association for Computational Linguistics, pp. 539-549, Apr. 23-27, 2012, Avignon, France.

International Search Report dated Jan. 15, 2021, issued in International Patent Application No. PCT/KR2020/013004.

European Search Report dated Jul. 25, 2022, issued in European Patent Application No. 20869116.2.

* cited by examiner

ELECTRONIC DEVICE AND CONTROLLING METHOD OF ELECTRONIC DEVICE

CROSS-REFERENCE TO RELATED APPLICATION(S)

This application is based on and claims priority under 35 U.S.C. § 119(a) of a Korean patent application number 10-2019-0119791, filed on Sep. 27, 2019, in the Korean Intellectual Property Office, the disclosure of which is incorporated by reference herein in its entirety.

BACKGROUND

1. Field

The disclosure relates to an electronic device and a controlling method of the electronic device. More particularly, the disclosure relates to an electronic device which is capable of performing machine translation for an acquired sentence and a controlling method of the electronic device.

2. Description of Related Art

Recently, as a technology that surpasses the limitation of statistical machine translation (SMT) of the related art, a technology for neural machine translation (NMT) is gaining attention.

Meanwhile, in the case of a translation model for machine translation, its performance is dependent on a learning corpus used for learning of a translation model. Specifically, the translation quality of an output sentence according to a translation model may be determined depending on whether an input sentence input into the translation model is familiar to a learning corpus used for learning of the translation model.

Here, whether an input sentence is familiar to a learning corpus may be determined depending on how many expressions in the same types as the expressions of the sentences included in the learning corpus used for learning of the translation model an input sentence input into the translation model includes. For example, if an input sentence includes several of the same types as the grammatical features, spacing, honorific expressions, etc. used in the sentences included in a learning corpus, the input sentence can be said to be familiar to the learning corpus. Detailed explanation regarding a criterion indicating whether an input sentence is familiar to a learning corpus will be made later.

For example, for acquiring an English sentence meaning, "If you take the number 700 bus, you can get there," a user may input a Korean sentence wherein an honorific expression is used such as, "Please take number 700, and you can go there," and a Korean sentence wherein an honorific expression is not used such as, "Take number 700, and you go there," respectively, into the same translation model for translating Korean into English.

Here, if the input sentence, "Please take number 700, and you can go there," is familiar to the learning corpus used for learning of the translation model, the translation model may output an English sentence with high quality reflecting the meaning of Korean properly, such as, "If you take number 700, you can go there." In contrast, if the input sentence, "Take number 700, and you go there," is not familiar to the learning corpus used for learning of the translation model, the translation model may output an English sentence with poor quality that does not reflect the meaning of Korean properly, such as, "Take number 700 and go there."

As in the aforementioned example, there is a problem that the translation quality of an output sentence output by a translation model may be determined according to whether honorific expressions are used in an input sentence, the differences in the grammatical features, the differences in spacing, etc. Meanwhile, as human languages do not follow fixed rules, it can be said to be practically impossible to construct a learning corpus for all expressions included in human languages for overcoming the aforementioned problem.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to correct an input sentence before inputting the input sentence into a translation model for machine translation, and then input the corrected input sentence into the translation model, and thereby improve the translation quality of the output sentence.

Additional aspects will be set forth in part in the description which follows and, in part, will be apparent from the description, or may be learned by practice of the presented embodiments.

In accordance with an aspect of the disclosure, an electronic device is provided. The electronic device includes a memory storing at least one instruction and a processor executing the at least one instruction. Also, the processor is configured to, based on acquiring a first sentence in a first language by executing the at least one instruction, determine whether to correct the first sentence to another sentence in the first language by using at least one language model trained based on a learning corpus, and based on determining to correct the first sentence to another sentence in the first language, input the first sentence into a conversion model trained to acquire another sentence having similarity greater than or equal to a threshold value to an input sentence and acquire a second sentence in the first language which is a corrected form of the first sentence, and based on acquiring the second sentence, input the second sentence into a translation model trained based on the learning corpus and acquire a third sentence in a second language.

In accordance with another aspect of the disclosure for, a controlling method of an electronic device is provided. The controlling method includes the operations of, based on acquiring a first sentence in a first language, determining whether to correct the first sentence to another sentence in the first language by using a first language model trained based on a parallel corpus and a second language model trained based on a mono corpus, and based on determining to correct the first sentence to another sentence in the first language, inputting the first sentence into a conversion model trained to acquire another sentence having similarity greater than or equal to a threshold value to an input sentence and acquiring a second sentence in the first language which is a corrected form of the first sentence, and based on acquiring the second sentence, inputting the second sentence into a translation model trained based on the learning corpus and acquiring a third sentence in the second language.

In accordance with another aspect of the disclosure, a non-transitory computer readable recording medium including a program executes a controlling method of an electronic device are provided. The controlling method of the electronic device includes the operations of, based on acquiring a first sentence in a first language, determining whether to correct the first sentence to another sentence in the first language by using a first language model trained based on a parallel corpus and a second language model trained based on a mono corpus, and based on determining to correct the first sentence to another sentence in the first language, inputting the first sentence into a first artificial intelligence model trained to acquire another sentence having similarity greater than or equal to a threshold value to an input sentence and acquiring a second sentence in the first language which is a corrected form of the first sentence, and based on acquiring the second sentence, inputting the second sentence into a translation model trained based on the learning corpus and acquiring a third sentence in the second language.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
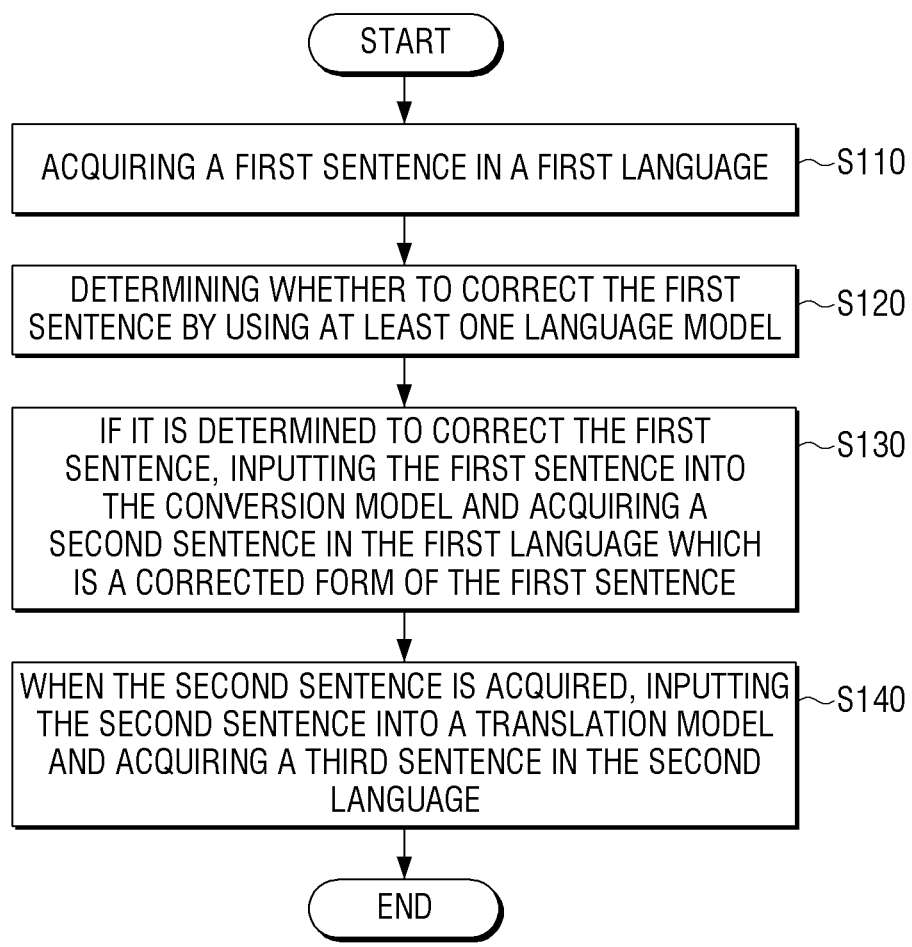
FIG. 1 is a diagram for schematically illustrating a controlling method of an electronic device according to an embodiment of the disclosure.

FIG. 1 is a flow chart for schematically illustrating a controlling method of an electronic device according to an embodiment of the disclosure.

Referring to FIG. 1, an electronic device according to an embodiment of the disclosure may acquire an input sentence in a first language, and acquire an output sentence which translated the input sentence into a second language. Specifically, the electronic device may input an input sentence in a first language into an artificial intelligence model for translating the first language into a second language, and acquire an output sentence in the second language.

Meanwhile, the translation quality of an output sentence according to a translation model for translating the first language into the second language may be determined depending on whether an input sentence input into the translation model is familiar to a learning corpus used for learning of the translation model.

Here, whether an input sentence is familiar to a learning corpus may be determined depending on how many expressions in the same types as the expressions of the sentences included in the learning corpus used for learning of the translation model an input sentence input into the translation model includes. For example, if an input sentence includes several of the same types as the grammatical features, spacing, honorific expressions, etc. used in the sentences included in a learning corpus, the input sentence can be said to be familiar to the learning corpus. Detailed explanation regarding a criterion indicating whether an input sentence is familiar to a learning corpus will be made later.

Specifically, compared to a case wherein an input sentence is a sentence familiar to a learning corpus used for learning of a translation model, in a case wherein an input sentence is a sentence not familiar to a learning corpus used for learning of a translation model, the translation quality of the output sentence may be relatively low.

For example, a user may respectively input a Korean sentence such as, "As spring has come, let's clean up," and a Korean sentence such as, "Let's do springtime clean up," which is a sentence wherein a postposition and spacing are omitted and "springtime," which is a word in the form of a compound noun, is included instead of "as spring has come," into the same translation engine for translating Korean into English.

Here, if the input sentence, "As spring has come, let's clean up," is familiar to the learning corpus used for learning of the translation engine, the translation engine may output an English sentence with high quality reflecting the meaning of Korean properly such as, "Let's clean up in the spring." In contrast, if the input sentence, "Let's do springtime clean up," is not familiar to the learning corpus used for learning of the translation engine, the translation engine may output an English sentence with poor quality that does not reflect the meaning of Korean properly such as, "Let's clean the spring."

Therefore, an electronic device according to the disclosure may correct an input sentence to a sentence familiar to a learning corpus used for learning of a translation model, before acquiring an output sentence which translated the input sentence, and then input the corrected input sentence into the translation model, and thereby acquire an output sentence having relatively high translation quality compared to a case of inputting an input sentence into a translation model without correcting the input sentence.

Meanwhile, there may be a case wherein, even if an input sentence is input into a translation model without being corrected, an output sentence with high translation quality can be acquired, and in contrast, there may be a case wherein, even if an input sentence is corrected and is input into a translation model, it is difficult to acquire an output sentence with high quality.

Therefore, an electronic device according to the disclosure may, before correcting an input sentence, determine whether to correct the input sentence by using at least one language model, and correct the input sentence only in a case wherein it is determined to correct the input sentence.

Hereinafter, a process of determining whether to correct an input sentence, and in case it is determined to correct the input sentence, a process of correcting the input sentence to a sentence familiar to a learning corpus used for learning of a translation model, and a process of translating the corrected input sentence and acquiring an output sentence will be explained with reference to FIG. 1. Meanwhile, for the convenience of explanation, hereinafter, an input sentence in the first language will be referred to as a first sentence, a sentence in the first language which is a corrected form of the first sentence will be referred to as a second sentence, and an output sentence in the second language will be referred to as a third sentence.

Referring to FIG. 1, the electronic device may acquire a first sentence, at operation S110, and when the first sentence is acquired, the electronic device may determine whether to correct the first sentence to another sentence by using at least one language model, at operation S120. Specifically, the electronic device may determine whether to correct the acquired first sentence to another sentence of the same language as the first sentence, by using at least one in a first language model trained based on a parallel corpus or a second language model trained based on a mono corpus.

Here, the first language model refers to a language model trained based on a parallel corpus, and the second language model refers to a language model trained based on a mono corpus. Also, learning corpuses are assemblages wherein samples of languages are extracted with a specific purpose for study of natural languages, and among them, a mono corpus refers to a corpus consisting of sentences of one language, and a parallel corpus refers to a corpus constituted in parallel such that sentences of different languages correspond to one another.

In particular, a parallel corpus or a mono corpus may be used for learning of at least one in the first language model, the second language model, a conversion model, or a translation model according to the disclosure. Specifically, a parallel corpus may be used for learning of the first language model, a conversion model, and a translation model, and a mono corpus may be used for learning of the second language model, a conversion model, and a translation model.

Meanwhile, the feature that the electronic device uses the first language model and the second language model means that the electronic device inputs the acquired first sentence into each of the first language model and the second language model, and respectively acquires a value related to a criterion indicating whether the first sentence is familiar to a parallel corpus used for learning of the first language model and a value related to a criterion indicating whether the first sentence is familiar to a mono corpus used for learning of the second language model. Here, as an example of a value related to a criterion indicating whether the first sentence is familiar to a parallel corpus and a mono corpus, there may be a perplexity value. That is, the electronic device may input the acquired first sentence into each in the first language model and the second language model, and acquire a first perplexity value for the first language model and a second perplexity value for the second language model.

Specifically, a perplexity value refers to a criterion indicating from how many words in average a language model selects an output word for every time-step of predicting the next word for an input sentence. For example, if perplexity is 10, it can be said that a language model selects an output word from 10 words in average for every time-step of predicting the next word for an input sentence. In contrast, if perplexity is 3, it can be said that a language model selects an output word from 3 words in average for every time-step of predicting the next word for an input sentence.

That is, the feature that a perplexity value is high may be interpreted as meaning that an input sentence is not familiar to a corpus constituting a language model. In contrast, the feature that a perplexity value is low may be interpreted as meaning that the performance of a language model for an input sentence is high, and the input sentence is familiar to the corpus constituting the language model.

When a first perplexity value for the first language model and a second perplexity value for the second language model are acquired, the electronic device may determine whether to correct the first sentence to another sentence in the first language based on at least one of the acquired first perplexity value and second perplexity value. Specifically, the electronic device may determine whether to correct the first sentence to another sentence in the first language by comparing the acquired first perplexity value with a predetermined first threshold value, or comparing the second perplexity value with a predetermined second threshold value, or comparing the first perplexity value and the second perplexity value respectively with a predetermined first threshold value and a predetermined second threshold value.

In particular, if the first perplexity value is smaller than a predetermined first threshold value, the electronic device may determine not to correct the acquired first sentence to another sentence. That is, if the first perplexity value is smaller than a predetermined first threshold value, it may be interpreted as meaning that the first sentence is familiar to a parallel corpus. Accordingly, a case like this can be deemed as a case wherein an output sentence with high translation quality can be acquired even if the first sentence is not corrected to another sentence, and thus the electronic device may determine not to correct the acquired first sentence to another sentence.

Meanwhile, if the second perplexity value is bigger than a predetermined second threshold value, the electronic device may also determine not to correct the acquired first sentence to another sentence in this case. That is, if the second perplexity value is bigger than a predetermined second threshold value, it may be interpreted as meaning that the first sentence is not familiar to a mono corpus. Meanwhile, a mono corpus may include more sentences than a parallel corpus, and in this case, if an input sentence is not familiar to a mono corpus, it may be much more unfamiliar to a parallel corpus.

Accordingly, the feature that the second perplexity value is bigger than a predetermined second threshold value may be interpreted as meaning not only that the first sentence is not familiar to a mono corpus, but also that the first sentence is much more unfamiliar to a parallel corpus. Accordingly, a case like this can be deemed as a case wherein it is difficult to acquire an output sentence with high translation quality even if the first sentence is corrected to another sentence, and thus the electronic device may determine not to correct the acquired first sentence to another sentence.

Meanwhile, if the first perplexity value is bigger than a predetermined first threshold value and the second perplexity value is smaller than a predetermined second threshold value, the electronic device may determine to correct the first sentence to the another sentence. That is, if the first perplexity value is bigger than a predetermined first threshold value and the second perplexity value is smaller than a predetermined second threshold value, it may be deemed as meaning that the first sentence is not familiar to a parallel corpus, but is familiar to a mono corpus. In other words, if the first perplexity value is bigger than a predetermined first threshold value and the second perplexity value is smaller than a predetermined second threshold value, it can be deemed as a case wherein the first sentence is corrected to a sentence familiar to a parallel corpus and is translated, and the translation quality of the output sentence can thereby be improved. Thus, the electronic device may determine to correct the first sentence to another sentence.

As described above, the first perplexity value acquired through the first language model may be a value related to a criterion indicating whether the first sentence is familiar to a parallel corpus, and the second perplexity value acquired through the second language model may be a value related to a criterion indicating whether the first sentence is familiar to a mono corpus. Also, a first threshold value regarding the first perplexity value may be interpreted as meaning a boundary value distinguishing how much familiar the first sentence is to a parallel corpus, and a second threshold value regarding the second perplexity value may be interpreted as meaning a boundary value distinguishing how much familiar the first sentence is to a mono corpus.

Meanwhile, a first threshold value regarding the first perplexity value and a second threshold value regarding the second perplexity value may respectively be changed according to a parallel corpus used for learning of the first language model and a mono corpus used for learning of the second language model, and they can also be obviously changed by user setting.

Also, as the first threshold value regarding the first perplexity value and the second threshold value regarding the second perplexity value are changed, the range of correcting the first sentence to another sentence may be determined. For example, it may mean that it is determined not to correct the first sentence to another sentence only for a case wherein the first sentence is more familiar to a parallel corpus as the first threshold value regarding the first perplexity is changed to be smaller. Also, it may mean that it is determined to correct the first sentence to another sentence in case the first sentence is less familiar to a parallel corpus as the first threshold value regarding the first perplexity is changed to be bigger.

A process of determining whether to correct an input sentence by using at least one in the first language model or the second language model will be described in more detail with reference to FIGS. 3 and 4.

If it is determined to correct the first sentence to another sentence, the electronic device may input the first sentence into the conversion model and acquire a second sentence which is a corrected form of the first sentence, at operation S130. Specifically, the electronic device may input the first sentence and a threshold value related to similarity to the first sentence into the conversion model, and acquire a second sentence having similarity greater than or equal to a threshold value to the first sentence. For example, in case the input sentence is, "Let's do springtime clean up," the electronic device may input the input sentence into the conversion model, and acquire a sentence such as, "As spring has come, let's clean up," as a second sentence having similarity greater than or equal to a threshold value to the first sentence.

Here, the conversion model refers to an artificial intelligence model trained to acquire another sentence having similarity greater than or equal to a threshold value to an input sentence. The conversion model may be a sequence-to-sequence model, and may include an encoder for processing of input data and a decoder for processing of output data. A detailed process of acquiring a second sentence through the conversion model will be described later with reference to FIG. 5.

Also, a threshold value related to similarity may have a range between 0 and 1, and as a threshold value is closer to 0, it may be interpreted as meaning that the first sentence and the second sentence are less similar, and as a threshold value is closer to 1, it may be interpreted as meaning that the first sentence and the second sentence are similar. Meanwhile, a threshold value related to similarity may be changed according to a learning corpus, and may be reconfigured based on the translation quality of a third sentence acquired through a translation model.

For example, in case a threshold value related to similarity is set as 0.97, the first sentence and the second sentence may be identical or very similar, and accordingly, even if the second sentence is input into a translation model, a third sentence which is identical or very similar to a case of inputting the first sentence into the same translation model may be acquired. That is, the difference in translation quality between an output sentence in the case of inputting the first sentence into a translation model without correcting it and an output sentence in the case of correcting the first sentence to the second sentence and inputting it into the same translation model may not be so big.

In contrast, in case a threshold value related to similarity is set as 0.70, if a second sentence having different meaning from the first sentence is acquired as the first sentence is corrected, compared to an output sentence in the case of inputting the first sentence into a translation model without correcting it, an output sentence in the case of correcting the first sentence to a second sentence and inputting it into the same translation model may have poorer translation quality.

Meanwhile, the conversion model as described above may be trained based on similarity (sentence similarity) between a plurality of sentences included in a mono corpus and a plurality of sentences included in a parallel corpus.

Specifically, the conversion model may be trained based on similarity between a plurality of sentences in the first language included in a mono corpus and a plurality of sentences in the first language included in a parallel corpus for translating the first language into the second language. For example, the conversion model may be trained through a process of mapping sentences not included in a parallel corpus among a plurality of sentences in the first language included in a mono corpus with sentences having similarity greater than or equal to a predetermined threshold value among a plurality of sentences in the first language included in a parallel corpus for translating the first language into the second language.

Meanwhile, in case a mono corpus includes a plurality of sentences in the first language, learning of the conversion model may be performed not only based on a parallel corpus for translating the first language into the second language, but also based on a parallel corpus for translating the second language into the first language.

In addition, the conversion model may be trained based on similarity among a plurality of sentences in the second language included in a parallel corpus for translating the first language into the second language. A detailed learning method of the conversion model will be described later with reference to FIG. 6.

If a second sentence in the first language is acquired through a trained conversion model as described above, the electronic device may input the second sentence into a translation model and acquire a third sentence in the second language, at operation S140. Here, the translation model is an artificial intelligence model trained to translate the first language into the second language, and refers to a so-called artificial intelligence model for neural machine translation (NMT). Specifically, the electronic device may input the second sentence into a translation model trained to translate the first language into the second language, and acquire a third sentence which translated the second sentence in the first language into the second language.

Meanwhile, if it is determined not to correct the first sentence to another sentence based on the first perplexity value and the second perplexity value through the aforementioned process, the electronic device may input the first sentence into the translation model without correcting it, and acquire a third sentence which translated the first sentence in the first language into the second language.

According to an embodiment of the disclosure as described above, by correcting an input sentence to a sentence familiar to a learning corpus used for learning of an artificial intelligence model before inputting the input sentence into the artificial intelligence model for machine translation, and then inputting the corrected input sentence into the artificial intelligence model, the translation quality of an output sentence can be improved.

Figure 2:
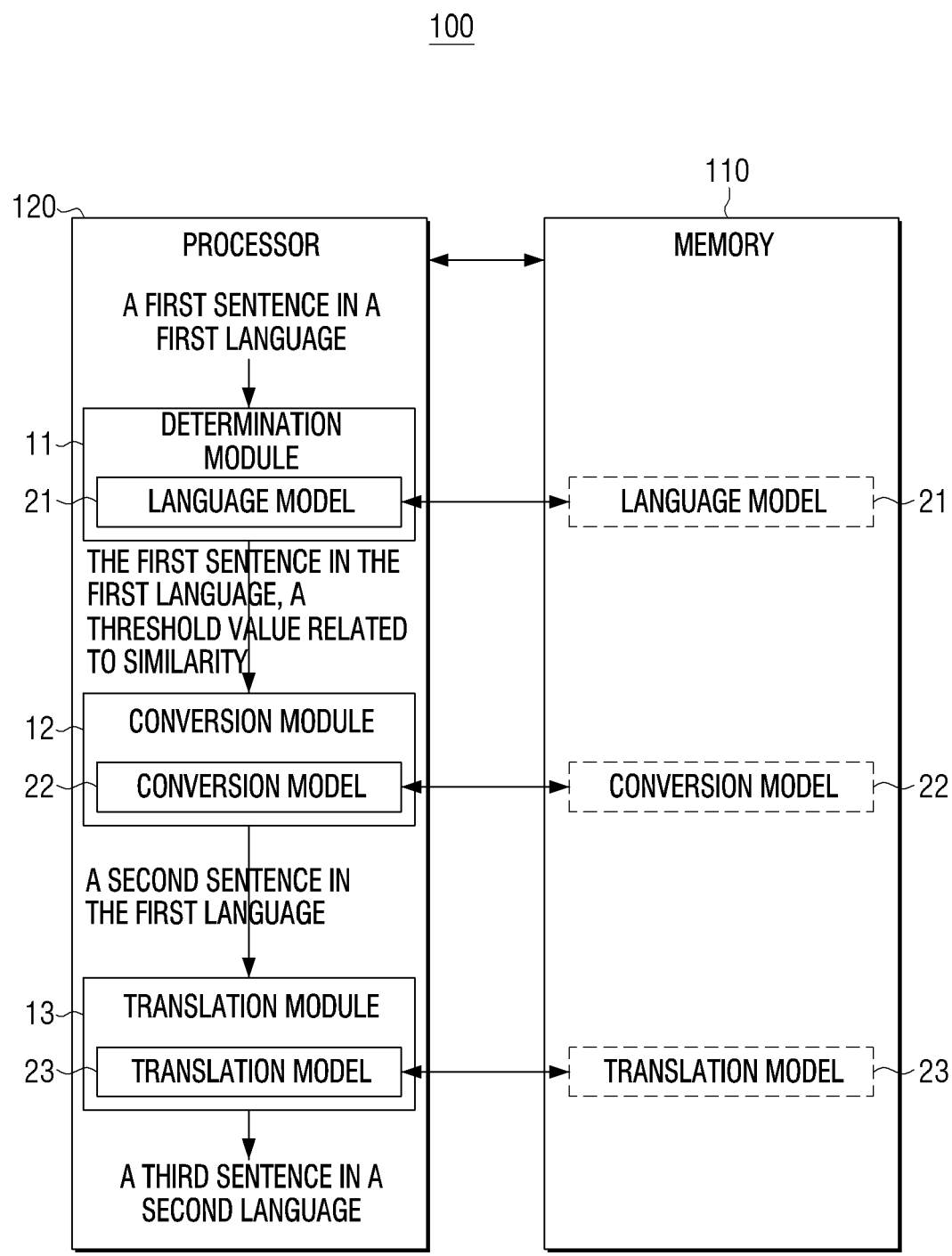
FIG. 2 is a diagram for illustrating on the premise of a combined relation between a hardware structure and a software structure of an electronic device according to an embodiment of the disclosure.

FIG. 2 is a diagram for illustrating an embodiment according to the disclosure on the premise of a combined relation between a hardware structure and a software structure of an electronic device according to an embodiment of the disclosure.

Referring to FIG. 2, an electronic device 100 according to an embodiment of the disclosure includes a memory 110 and a processor 120.

In the memory 110, at least one instruction regarding the electronic device 100 may be stored. Specifically, in the memory 110, various types of software modules for making the electronic device 100 operate according to the various embodiments of the disclosure may be stored.

In particular, at least one artificial intelligence model among artificial intelligence models according to the various embodiments of the disclosure may be stored in the memory 110 in the form of data. Specifically, as illustrated in FIG. 2, in the memory 110, a language model 21, a conversion model 22, and a translation model 23 may be stored. In FIG. 2, the language model is simply described as a language model, but as described above, the language model 21 according to the disclosure may include a first language model and a second language model. That is, in the memory 110, a first language model trained based on a parallel corpus and a second language model trained based on a mono corpus may be stored.

Here, the feature that the language model 21, the conversion model 22, and the translation model 23 are stored in the memory 110 means that all data necessary for executing the language model 21, the conversion model 22, and the translation model 23 and performing the functions thereof is stored in the memory 110. Meanwhile, in the memory 110, in addition to data necessary for learning of the language model 21, the conversion model 22, and the translation model 23, various data related to the language model 21, the conversion model 22, and the translation model 23 may be stored.

The processor 120 controls the overall operations of the electronic device 100. Specifically, the processor 120 may control the overall operations of the electronic device 100 by executing at least one instruction stored in the memory 110.

Referring to FIG. 2, the processor 120 may include a plurality of modules implemented to perform each operation according to the disclosure. Specifically, the processor 120 according to the disclosure may include a determination module 11 determining whether to correct an input sentence, a conversion module 12 correcting an input sentence, and a translation module 13 translating an input sentence.

In particular, each of the plurality of modules may perform operations of each of the plurality of modules by using a plurality of artificial intelligence models (e.g., the language model 21, the conversion model 22, and the translation model 23) corresponding thereto. Specifically, as illustrated in FIG. 2, the processor 120 may load a plurality of artificial intelligence models stored in the memory 110, and the plurality of modules included in the processor 120 may perform various operations according to the disclosure by using the plurality of artificial intelligence models.

Here, loading means an operation of calling in an artificial intelligence model such that the processor 120 can access, and detailed meaning thereof may be determined according to implementation examples of the memory 110 and the processor 120. For example, the processor 120 may load the plurality of artificial intelligence models on a static random access memory (SRAM) in the processor 120 and access them, or load the plurality of artificial intelligence models from a flash memory which is a non-volatile memory included in the memory 110 to a dynamic random access memory (DRAM) which is a volatile memory included in the memory 110, and access them.

In particular, when the first sentence in the first language is acquired, the determination module 11 included in the processor 120 may determine whether to correct the first sentence to another sentence in the first language. Specifically, if the first sentence in the first language is input into the determination module 11, the determination module 11 may determine whether to correct the first sentence to another sentence in the first language by using at least one language model (e.g., the language model 21).

If it is determined to correct the first sentence to another sentence in the first language, the conversion module 12 included in the processor 120 may acquire a second sentence in the first language which is a corrected form of the first sentence. Specifically, if the first sentence in the first language and a threshold value related to similarity are input into the conversion module 12, the conversion module 12 may acquire a second sentence in the first language by using the conversion model 22 trained to acquire another sentence having similarity greater than or equal to a threshold value to an input sentence.

When a second sentence in the first language is acquired, the translation module 13 included in the processor 120 may acquire a third sentence in the second language. Specifically, when a second sentence in the first language is input into the translation module 13, the translation module 13 may acquire a third sentence in the second language by using the translation model 23 trained to translate the first language into the second language.

So far, a process wherein the processor 120 loads a plurality of artificial intelligence models included in the memory 110, and a plurality of modules included in the processor 120 perform operations according to the disclosure by using the plurality of artificial intelligence models was described. However, this is just for explaining in detail a systematic combination of hardware and software for implementing operations according to the disclosure, and the disclosure is not limited to a case of including a software architecture as illustrated in FIG. 2. That is, within a range for achieving the purpose of the disclosure, types and names of a plurality of models and a plurality of artificial intelligence models may be determined differently from what are illustrated in FIG. 2.

Meanwhile, at least one artificial intelligence model among the plurality of artificial intelligence models according to the various embodiments of the disclosure may be implemented in the form of a dedicated hardware chip that can perform the algorithm of the artificial intelligence model and to be included in the processor 120.

Hereinafter, a controlling process of the processor 120 and operations of the electronic device 100 according to control of the processor 120 according to the various embodiments of the disclosure will be described in detail with reference to FIGS. 3 to 7B.

Figure 3:
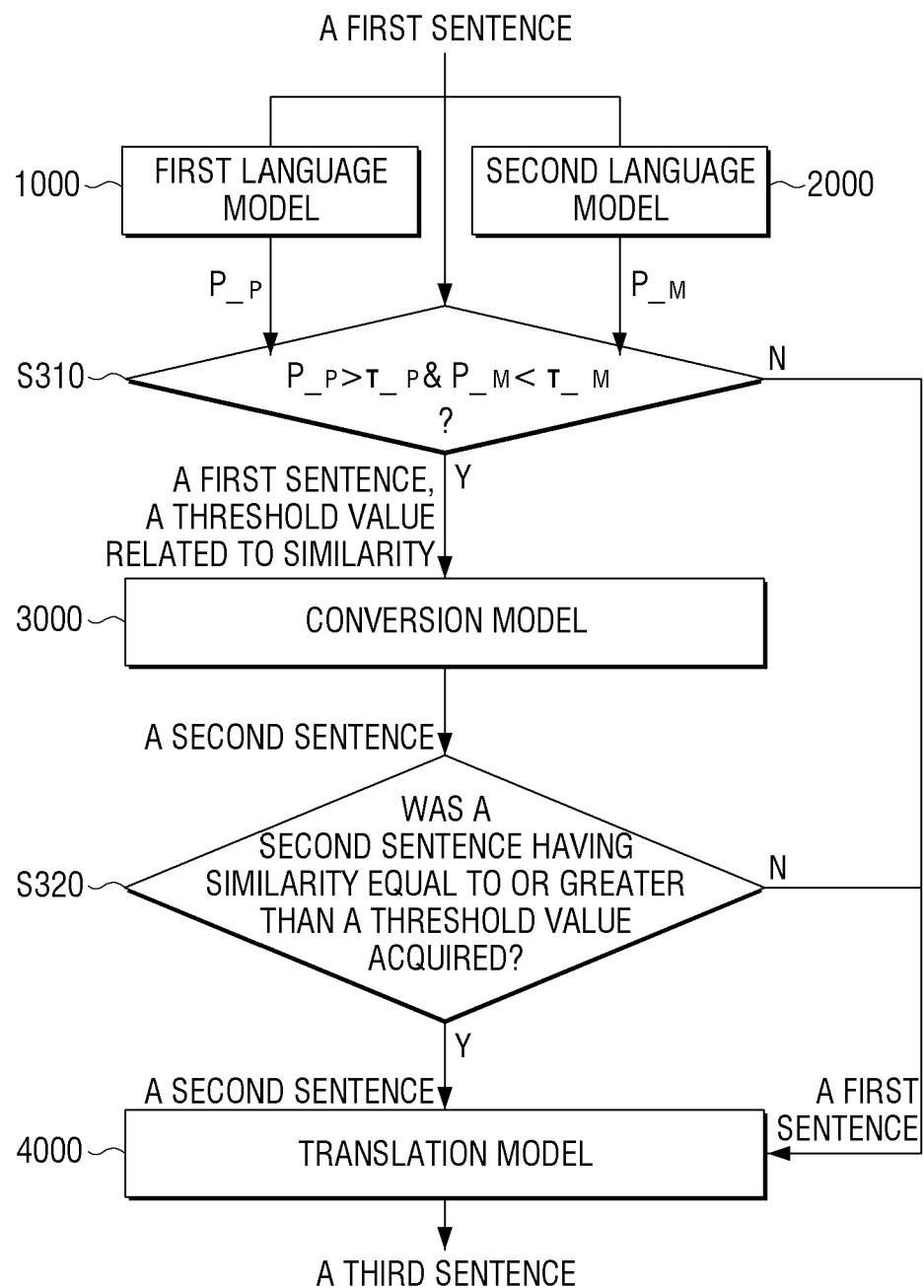
FIG. 3 is a flow chart for illustrating in detail a controlling process according to an embodiment of the disclosure.
Figure 4:
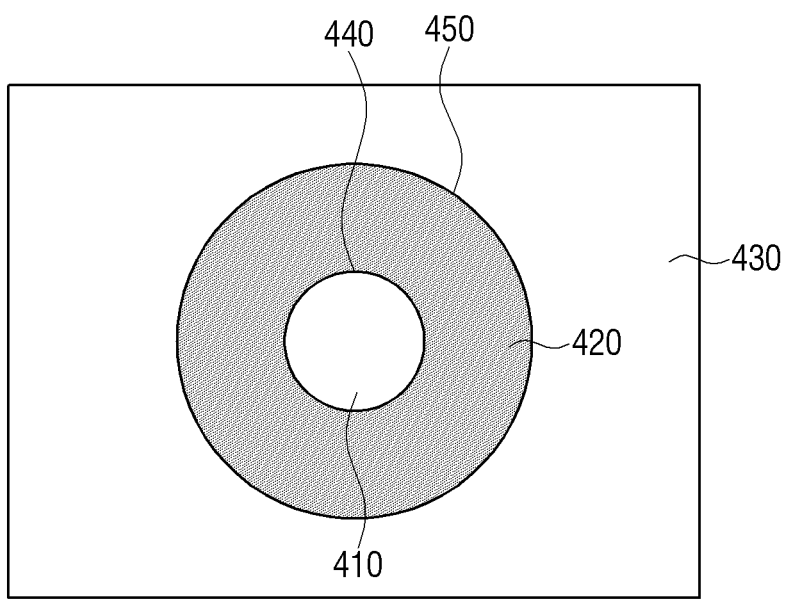
FIG. 4 is a mimetic diagram for illustrating in detail a process of determining whether to correct an input sentence according to an embodiment of the disclosure.
Figure 5:
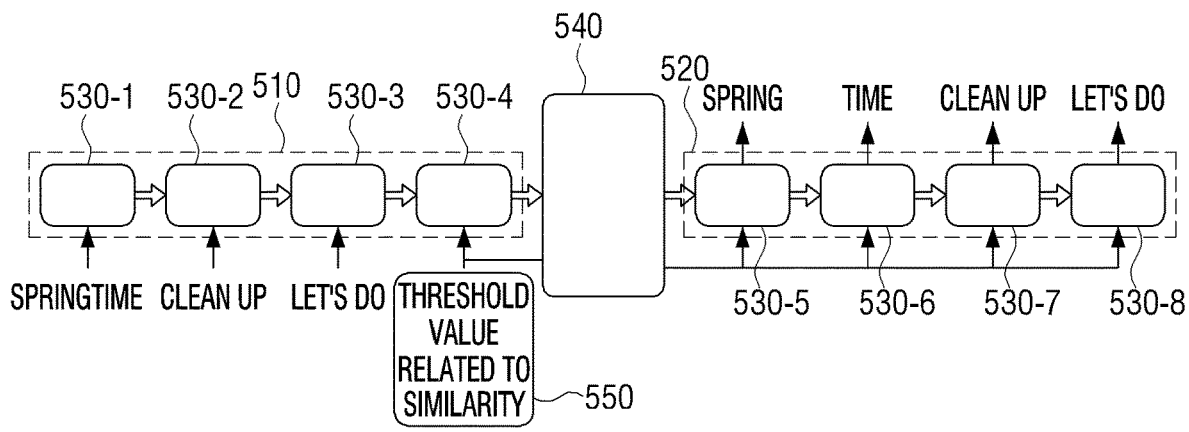
FIG. 5 is a diagram for illustrating in detail a process of correcting an input sentence to a sentence familiar to a parallel corpus through a conversion model according to an embodiment of the disclosure.

FIG. 3 is a flow chart for illustrating in detail a controlling process according to an embodiment of the disclosure, FIG. 4 is a mimetic diagram for illustrating in detail a process of determining whether to correct an input sentence according to an embodiment of the disclosure, and FIG. 5 is a diagram for illustrating in detail a process of correcting an input sentence to a sentence familiar to a parallel corpus through a conversion model according to an embodiment of the disclosure.

As in the description regarding FIG. 1, hereinafter, an input sentence in the first language will be referred to as a first sentence, and a sentence of the first language which is a corrected form of the first sentence will be referred to as a second sentence, and an output sentence in the second language will be referred to as a third sentence. Meanwhile, in describing the disclosure, correcting the first sentence to a second sentence may be used as meaning including changing the first sentence to a second sentence or changing the first sentence and generating a second sentence.

As described above, when the first sentence is acquired, the processor 120 may determine whether to correct the first sentence to another sentence. Whether to correct the first sentence may be determined based on at least one of a first perplexity value or a second perplexity value acquired by using at least one of a first language model 1000 or a second language model 2000.

In particular, referring to FIG. 3, whether to correct the first sentence may be determined based on a first perplexity value and a second perplexity value acquired by using the first language model 1000 and the second language model 2000.

In FIG. 3, the first perplexity value acquired by inputting the first sentence into the first language model 1000 was expressed as P p, and the second perplexity value acquired by inputting the first sentence into the second language model 2000 was expressed as $P_{\_M}$. Also, in FIG. 3, the first threshold value for the first perplexity value was expressed as $\tau_{\_P}$, and the second threshold value for the second perplexity value was expressed as $\tau_{\_M}$.

Referring to FIG. 3, when the first sentence is acquired, the processor 120 may input the first sentence into the first language model 1000 and acquire a first perplexity value, and input the first sentence into the second language model 2000 and acquire a second perplexity value. When a first perplexity value and a second perplexity value are acquired, the processor 120 may compare the first perplexity value with a predetermined first threshold value, and compare the second perplexity value with a predetermined second threshold value, and thereby determine whether to correct the first sentence, at operation S310.

Here, the meaning of the first language model 1000, the second language model 2000, and the perplexity values was described above with reference to FIG. 1.

The process of determining whether to correct the first sentence (S310) will be described in detail with reference to FIG. 4 together with FIG. 3. Specifically, FIG. 4 is a diagram which conceptually illustrates a standard for determining whether to correct the first sentence based on the relation between the first perplexity value and the first threshold value, and the relation between the second perplexity value and the second threshold value.

Referring to FIG. 4, a first area 410 illustrates a case wherein the first perplexity value is smaller than the predetermined first threshold value ($P_{\_P} < \tau_{\_P}$). That is, the first area 410 is for expressing a case wherein the first sentence is familiar to a parallel corpus. Accordingly, in case the first sentence is within the first area 410, it can be deemed as a case wherein an output sentence with high translation quality can be acquired even if the first sentence is not corrected to another sentence. Thus, the processor 120 may determine not to correct the acquired first sentence to another sentence.

A second area 420 in FIG. 4 illustrates a case wherein the first perplexity value is bigger than the predetermined first threshold value and the second perplexity value is smaller than the predetermined second threshold value ($P_{\_P} > \tau_{\_P}$ & $P_{\_M} < \tau_{\_M}$). That is, the second area 420 expresses a case wherein the first sentence is not familiar to a parallel corpus, but is familiar to a mono corpus. Accordingly, in case the first sentence is within the second area 420, it can be deemed as a case wherein the translation quality of an output sentence can be improved by correcting the first sentence to a sentence familiar to a parallel corpus and translating it. Thus, the processor 120 may determine to correct the acquired first sentence to another sentence.

A third area 430 in FIG. 4 illustrates a case wherein the second perplexity value is bigger than the predetermined second threshold value ($P_{\_M} > \tau_{\_M}$). That is, the third area 430 expresses a case wherein the first sentence is not familiar to a mono corpus. Meanwhile, a mono corpus may include more sentences than a parallel corpus, and in this case, if the first sentence is not familiar to a mono corpus, it may be much more unfamiliar to a parallel corpus.

That is, the third area 430 may express a case wherein the first sentence is not only unfamiliar to a mono corpus, but also much more unfamiliar to a parallel corpus. Accordingly, in case the first sentence is within the third area 430, it can be deemed as a case wherein it is difficult to acquire an output sentence with high translation quality even if the first sentence is corrected to another sentence. Thus, the processor 120 may determine not to correct the acquired first sentence to another sentence.

Meanwhile, as described above, a first threshold value regarding the first perplexity value may be interpreted as meaning a boundary value distinguishing how much familiar an input sentence is to a parallel corpus, and a second threshold value regarding the second perplexity value may be interpreted as meaning a boundary value distinguishing how much familiar an input sentence is to a mono corpus. Accordingly, a boundary 440 distinguishing the first area 410 and the second area 420 in FIG. 4 corresponds to the first threshold value, and a boundary 450 distinguishing the second area 420 and the third area 430 in FIG. 4 corresponds to the second threshold value.

Meanwhile, the first area 410, the second area 420, and the third area 430 in FIG. 4 as described above is just for conceptually illustrating a standard for determining whether to correct the first sentence according to the disclosure. Also, in the disclosure, there are no limitations, for example, that all of a plurality of sentences in the first language included in a parallel corpus for translating the first language into the second language should be included in a plurality of sentences in the first language included in a mono corpus according to the disclosure, etc.

Also, as long as there is no inclusive relation between a parallel corpus and a mono corpus according to the disclosure, there is no specific relation between a first threshold value related to a parallel corpus and a second threshold value related to a mono corpus. That is, it should not be interpreted that the second threshold value is bigger than the first threshold value, on the basis that the boundary 450 distinguishing the second area 420 and the third area 430 in FIG. 4 is located more to the outside than the boundary 440 distinguishing the first area 410 and the second area 420 in FIG. 4.

If it is determined not to correct the first sentence to another sentence through the aforementioned process, at operation S310-N, the processor 120 may input the first sentence into a translation model 4000 trained to translate the first language into the second language without correcting it, and acquire a third sentence which translated the first sentence in the first language into the second language.

Meanwhile, if it is determined to correct the first sentence to another sentence, at operation S310-Y, the processor 120 may input the first sentence into a conversion model 3000 and acquire a second sentence which is a corrected form of the first sentence. The processor 120 may determine whether the second sentence has a similarity equal to or greater than a threshold value, at operation S320.

The process of correcting the first sentence to the second sentence through the conversion model 3000 (S320) will be described in more detail with reference to FIG. 5 together with FIG. 3.

Referring to FIG. 5, the conversion model 3000 according to an embodiment of the disclosure may be a sequence-to-sequence model. Here, sequences mean continuous data related to one another, and sentences such as the first sentence, the second sentence, and the third sentence in the disclosure may be examples of such sequences.

The conversion model 3000 may include an encoder 510 for processing of input data and a decoder 520 for processing of output data. Also, the encoder 510 and the decoder 520 may include a plurality of recurrent neural network (RNN) cells 530-1 to 530-8. To be more specific, the plurality of RNN cells 530-1 to 530-8 may be constituted as a long short-term memory (LSTM) or a gated recurrent unit (GRU). Meanwhile, the conversion model 3000 according to the disclosure is not limited to the aforementioned examples.

The encoder 510 receives an input sentence. Specifically, a received input sentence may be divided into word units through tokenization. Each divided word may be converted into a vector through word embedding. Also, each word converted into a vector becomes input of each time-step for each RNN cell included in the encoder 510. For example, as illustrated in FIG. 5, in case an input sentence is "Let's do springtime clean up," the input sentence may be divided into words such as "springtime," "clean up," and "let's do" through word tokenization. Then, each divided word is converted into a vector through word embedding, and is input into each RNN cell.

Also, the encoder 510 transfers the hidden state of a last time-step 540 of the encoder 510 RNN cell referred to as a context vector or encoder 510 state to the decoder 520. The hidden state of the present time-step can be deemed as a result of accumulatively reflecting the effects of all values of the hidden state of the RNN cell of the past time-step, and thus the context vector can be deemed to include information of all words of the input sentence.

Meanwhile, according to the disclosure, the processor 120 inputs not only the first sentence which is an input sentence but also a threshold value 550 related to similarity to the first sentence together with the first sentence into the conversion model 3000. That is, the encoder 510 may receive not only the first sentence, but also a threshold value related to similarity to the first sentence, and transfer the received threshold value to each decoder 520 RNN cell.

The decoder 520 outputs an output sentence corresponding to the input sentence. Specifically, when the context vector is transferred to the decoder 520, the decoder 520 uses the context vector as the hidden state of the decoder 520 RNN cell of the first time-step, and stochastically predicts the word of the first time-step. Then, the decoder 520 inputs the word of the first time-step into the decoder 520 RNN cell of the second time-step, and stochastically predicts the word of the second time-step.

Further, the decoder 520 may predict each output word by a method of inputting the word of the n−1th time-step into the decoder 520 RNN cell of the nth time-step, and stochastically predicting the word of the n-th time step. To be more specific, the decoder 520 may acquire the probability value of each word of the output sentence through a softmax function, and predict each output word based on the acquired probability value.

Meanwhile, according to the disclosure, each decoder 520 RNN cell receives a threshold value related to similarity to the first sentence from the encoder 510, and accordingly, in predicting output words, the output words may be predicted in consideration of the received threshold value.

As described above, when output words are predicted, the decoder 520 may output an output sentence consisting of the output words. For example, in case the input sentence is, "Let's do springtime clean up," and the threshold value 550 related to similarity to the first sentence is a threshold value having high similarity such as 0.95, the decoder 520 may output an output sentence consisting of words such as, "spring," "time," "clean up," and "let's do."

Further, the conversion model 3000 may further include an attention module, although not illustrated in FIG. 5. An attention module may be a module which refers to an entire input sentence for each time-step of predicting an output word, and in doing so, refers to a word related to a word to be predicted of a time-step with attention. If the conversion model 3000 includes an attention module, degradation of the quality of an output sentence that is caused in case an input sentence becomes longer can be prevented.

Meanwhile, the conversion model 3000 is not for translation of an input sentence, but is just for correcting an input sentence to a sentence familiar to a parallel corpus. Accordingly, the conversion model 3000 may not need a lot of layers compared to the translation model 4000 that will be described below. Also, as the length of an output sentence acquired through the conversion model 3000 may not change greatly compared to an input sentence, processes such as bucketing and padding for processing input sentences and output sentences of various lengths can be simplified, and as a non-autoregressive decoder removing dependency for the previous token is used in input at the decoder 520, decoding time can be shortened. That is, even if the electronic device 100 further includes the conversion model 3000 according to the disclosure in addition to a general artificial intelligence model for neural machine translation (NMT), burden on the memory 110 or in design may not be caused.

As described above, the processor 120 may input the first sentence and a threshold value related to similarity to the first sentence into the conversion model 3000, and acquire a second sentence having similarity greater than or equal to the threshold value to the first sentence. Also, if a second sentence having similarity greater than or equal to the threshold value to the first sentence is acquired, at operation S320-Y, the processor 120 may input the acquired corrected second sentence into the translation model 4000 trained to translate the first language into the second language, and acquire a third sentence which translated the second sentence in the first language into the second language.

In contrast, if a second sentence having similarity greater than or equal to the threshold value to the first sentence is not acquired, at operation S320-N, the processor 120 may input the first sentence not corrected into the translation model 4000 trained to translate the first language into the second language, and acquire a third sentence which translated the first sentence in the first language into the second language.

Here, both of the sentence which translated the second sentence in the first language into the second language and the sentence which translated the first sentence in the first language into the second language were referred to as a third sentence, but this is just in line with referring to a sentence output through the translation model 4000 as a third sentence. That is, if sentences input into the translation model 4000 are different as the first sentence and the second sentence, sentences output through the translation model 4000 can obviously be different from each other.

Meanwhile, in case an input sentence is the same first sentence in Korean, depending on whether the translation model is an artificial intelligence model trained to translate Korean into English, or an artificial intelligence model trained to translate Korean into Chinese, the second sentence which is a corrected form of the first sentence and a third sentence which translated the second sentence can obviously be different. That is, in the case of an artificial intelligence model for machine translation, parallel corpuses used for learning are different for each translation language, and thus the second sentence which was corrected to be familiar to the parallel corpus may become different, and if the second sentence becomes different, the third sentence which translated the second sentence may also become different.

Figure 6:
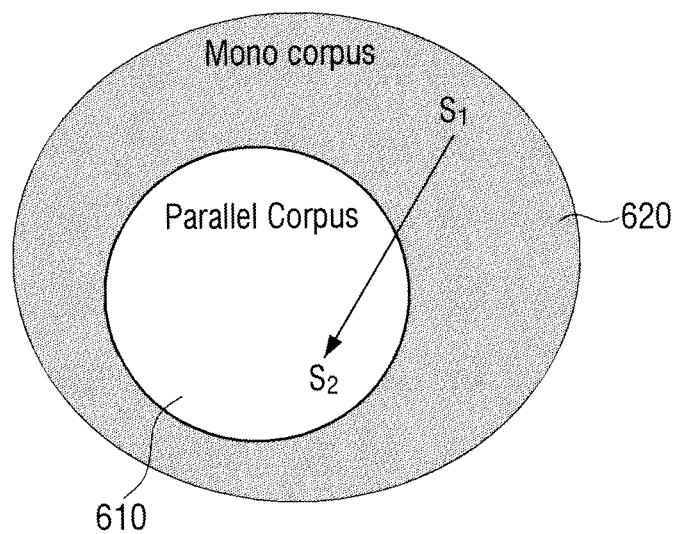
FIG. 6 is a diagram for illustrating a learning process of a conversion model according to an embodiment of the disclosure.

FIG. 6 is a diagram for illustrating a learning process of a conversion model according to an embodiment of the disclosure.

Referring to FIG. 6, and as described above with reference to FIG. 4, a mono corpus generally includes more sentences than a parallel corpus. That is, in general, if an input sentence is not familiar to a mono corpus, the input sentence is not familiar to a parallel corpus, either. In consideration of such a relation between a parallel corpus and a mono corpus, FIG. 6 conceptually illustrates an area 610 of a parallel corpus and an area 620 of a mono corpus not included in the area 610 of a parallel corpus, and a sentence s2 included in the area 610 of a parallel corpus and a sentence s1 included in the area 620 of a mono corpus not included in the area 610 of a parallel corpus.

Meanwhile, as described above, the electronic device 100 may input a first sentence and a threshold value related to similarity to the first sentence into a conversion model, and acquire a second sentence having similarity greater than or equal to the threshold value to the first sentence. Meanwhile, the second sentence acquired through the conversion model may vary according to learning of the conversion model. Accordingly, there is a need to train the conversion model through a process of mapping the sentence s1 in the area 620 of a mono corpus not included in the area 610 of a parallel corpus with the sentence s2 in the area 610 of a parallel corpus.

The conversion model according to the disclosure may be trained based on similarity (sentence similarity) between a plurality of sentences included in a mono corpus and a plurality of sentences included in a parallel corpus.

First, the conversion model may be trained based on similarity between a plurality of sentences in the first language included in a mono corpus and a plurality of sentences in the first language included in a parallel corpus for translating the first language into the second language. Specifically, the conversion model may be trained through a process of mapping a sentence s1 not included in a parallel corpus among a plurality of sentences in the first language included in a mono corpus with a sentence s2 having similarity greater than or equal to a predetermined threshold value among a plurality of sentences in the first language included in a parallel corpus for translating the first language into the second language.

To be more specific, the conversion model identifies a first learning sentence s1 not included in a parallel corpus among a plurality of sentences in the first language included in a mono corpus, and identifies a second learning sentence s2 having similarity greater than or equal to a predetermined threshold value to the first learning sentence s1 among a plurality of sentences in the first language included in a parallel corpus for translating the first language into the second language. Here, the process of identifying the second learning sentence s2 may be performed through various known methods such as analysis using Levenshtein distance or N-gram, etc. When the second learning sentence s2 is identified, the conversion model may be trained through a process of mapping the first learning sentence s1 with the second learning sentence s2.

Second, the conversion model may be trained based on similarity between a plurality of sentences in the first language included in a mono corpus and a plurality of sentences in the first language included in a parallel corpus for translating the second language into the first language. In other words, in case a mono corpus includes a plurality of sentences in the first language, learning of the conversion model may be performed not only based on a parallel corpus for translating the first language into the second language, but also based on a parallel corpus for translating the second language into the first language.

Third, the conversion model may be trained based on similarity among a plurality of sentences in the second language included in a parallel corpus for translating the first language into the second language. To be more specific, in case the parallel corpus is for translating the first language into the second language, the similarity value among a plurality of sentences in the second language included in the parallel corpus may be set as a similarity value among a plurality of sentences in the first language corresponding to each of the plurality of sentences in the second language, and the conversion model may be trained such that the plurality of sentences in the first language are mapped with one another based on the set similarity value.

So far, a learning method of the conversion model was described in detail, but the learning method of the conversion model is not limited to the embodiment as described above. Meanwhile, not only the conversion model, but also the first language model, the second language model, and the translation model can obviously be trained through various known methods, and the first language model, the second language model, the conversion model, and the translation model may be trained while at least some of their entire pipelines are combined.

Figure 7A:
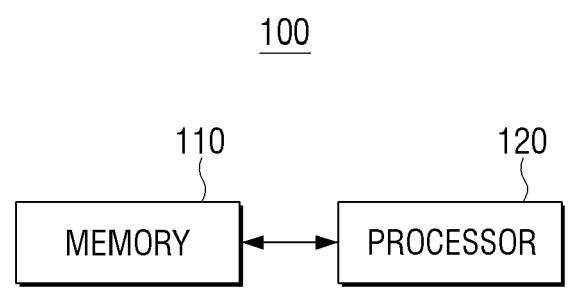
FIG. 7A is a block diagram schematically illustrating a configuration of an electronic device according to an embodiment of the disclosure.
Figure 7B:
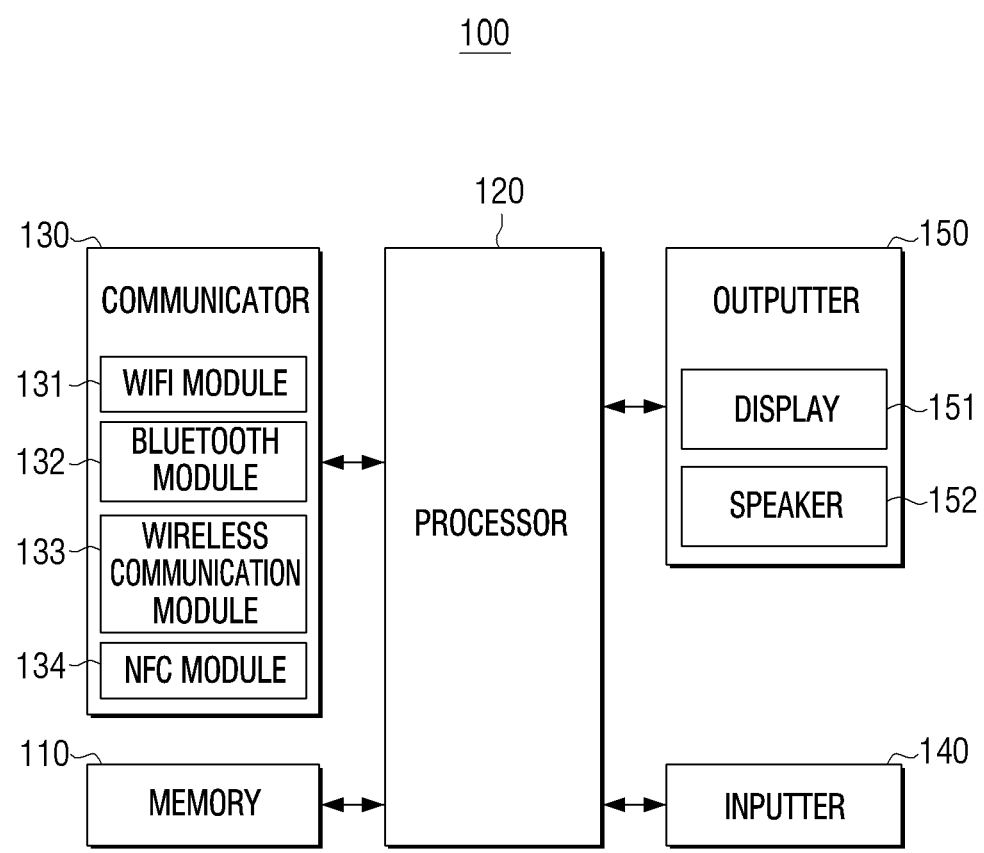
FIG. 7B is a block diagram illustrating in detail a configuration of an electronic device according to an embodiment of the disclosure.

FIG. 7A is a block diagram schematically illustrating a configuration of an electronic device according to an embodiment of the disclosure, and FIG. 7B is a block diagram illustrating in detail a configuration of an electronic device according to an embodiment of the disclosure.

Referring to FIG. 7A, the electronic device 100 according to an embodiment of the disclosure includes the memory 110 and the processor 120. The process wherein the processor 120 loads a plurality of artificial intelligence models included in the memory 110, and the plurality of modules included in the processor 120 perform operations according to the disclosure by using the plurality of artificial intelligence models was described above with reference to FIG. 2. Thus, in FIG. 7A, explanation will be made focused on the detailed configurations of the memory 110 and the processor 120.

In the memory 110, at least one instruction regarding the electronic device 100 may be stored. Also, in the memory 110, an operating system (O/S) for operating the electronic device 100 may be stored. In addition, in the memory 110, various types of software programs or applications for making the electronic device 100 operate according to various embodiments of the disclosure may be stored. Also, the memory 110 may include a semiconductor memory such as a flash memory or a magnetic storage medium such as a hard disk.

Specifically, in the memory 110, various types of software modules for making the electronic device 100 operate according to various embodiments of the disclosure may be stored, and the processor 120 may control the operations of the electronic device 100 by executing the various types of software modules stored in the memory 110. That is, the memory 110 may be accessed by the processor 120, and reading/recording/correcting/deleting/updating, etc. of data by the processor 120 may be performed.

Meanwhile, in the disclosure, the term memory 110 may be used as meaning including the memory 110, a read-only memory (ROM) (not shown) inside the processor 120, a random access memory (RAM) (not shown), or a memory card (not shown) (e.g., a micro SD card, a memory stick) installed on the electronic device 100, and it may also be used as meaning including a non-volatile memory such as a flash memory and a programmable read-only memory (PROM) and a volatile memory such as a dynamic random-access memory (DRAM) and a static RAM (SRAM).

In particular, in the memory 110 according to the disclosure, at least one language model, a conversion model, and a translation model may be stored. As a plurality of artificial intelligence models stored in the memory 110 were described above with reference to FIG. 2, overlapping explanation will be omitted.

The processor 120 controls the overall operations of the electronic device 100. Specifically, the processor 120 may be connected with the components of the electronic device 100 including the aforementioned memory 110, and may control the overall operations of the electronic device 100 by executing at least one instruction stored in the aforementioned memory 110.

The processor 120 may be implemented in various ways. For example, the processor 120 may be implemented as at least one of an application specific integrated circuit (ASIC), an embedded processor, a microprocessor, a hardware control logic, a hardware finite state machine (FSM), or a digital signal processor (DSP). Meanwhile, in the disclosure, the term processor may be used as meaning including a central processing unit (CPU), a graphic processing unit (GPU), a main processing unit (MPU), etc.

In particular, when a first sentence in the first language is acquired, the processor 120 according to the disclosure determines whether to correct the first sentence to another sentence in the first language by using a second language model trained based on a learning corpus, and if it is determined to correct the first sentence to another sentence in the first language, the processor 120 inputs the first sentence into a conversion model trained to acquire another sentence having similarity greater than or equal to a threshold value to the input sentence and acquires a second sentence in the first language which is a corrected form of the first sentence. Then, when the second sentence is acquired, the processor 120 inputs the second sentence into a translation model trained based on the learning corpus and acquires a third sentence in the second language. As various embodiments according to the disclosure were described above with reference to FIGS. 1 to 6, overlapping explanation will be omitted.

The functions related to artificial intelligence according to the disclosure may be performed through the memory 110 and the processor 120.

The processor 120 may consist of one or a plurality of processors. Here, the one or plurality of processors may be generic-purpose processors such as a CPU, an AP, etc., graphic-dedicated processors such as a GPU, a voice processing unit (VPU), etc., or artificial intelligence-dedicated processors such as a neural processing unit (NPU).

The one or plurality of processors perform control such that input data is processed according to predefined operation rules or an artificial intelligence model stored in the memory 110. The predefined operation rules or the artificial intelligence model are characterized in that they are made through learning.

Here, the feature that the predefined operation rules or the artificial intelligence model are made through learning means that predefined operation rules or an artificial intelligence model having desired characteristics are made by applying a learning algorithm to a plurality of learning data. Such learning may be performed at a device performing artificial intelligence according to the disclosure itself, or through a separate server/a separate system.

An artificial intelligence model may consist of a plurality of neural network layers. Each layer has a plurality of weight values, and performs an operation of the layer through the operation result of the previous layer and an operation of the plurality of weight values. As example of a neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN), generative adversarial networks (GANs), and deep Q-networks, but the neural network in the disclosure is not limited to the aforementioned examples excluding specified cases.

A learning algorithm is a method of training a specific subject device (e.g., a robot) by using a plurality of learning data and making the specific subject device make a decision or make predictions by itself. As examples of a learning algorithm, there are supervised learning, unsupervised learning, semi-supervised learning, or reinforcement learning, but the learning algorithm in the disclosure is not limited to the aforementioned examples excluding specified cases.

Meanwhile, referring to FIG. 7B, the electronic device 100 according to an embodiment of the disclosure may not only include the memory 110 and the processor 120, but may also further include a communicator 130, an inputter 140, and an outputter 150. However, such components are merely exemplary ones, and in implementing the disclosure, new components can obviously be added in addition to such components, or some components can be omitted.

The communicator 130 includes circuitry, and may perform communication with a server or an external device. Specifically, the communicator 130 may include at least one of a Wi-Fi module 131, a Bluetooth module 132, a wireless communication module 133, or a near field communication (NFC) module 134.

Specifically, each of the Wi-Fi module 131 and the Bluetooth module 132 may perform communication by a Wi-Fi method and a Bluetooth method. In the case of using the Wi-fi module 131 or the Bluetooth module 132, various kinds of connection information such as a service set identifier (SSID) may be transmitted and received first, and communication may be connected by using this, and then various kinds of information may be transmitted and received.

Also, the wireless communication module 133 may perform communication according to various communication standards such as IEEE, Zigbee, 3rd Generation (3G), 3rd Generation Partnership Project (3GPP), Long Term Evolution (LTE), and 5th Generation (5G). In addition, the NFC module 134 may perform communication by an NFC method using a 13.56 MHz band among various RF-ID frequency bands such as 135 kHz, 13.56 MHz, 433 MHz, 860~960 MHz, and 2.45 GHz.

The processor 120 may establish connection of communication with an external device through the communicator 130, and receive various kinds of data or information from the external device, and control the communicator 130 to transmit the various kinds of data or information to the external device. In particular, according to an embodiment of the disclosure, the processor 120 may receive an input sentence from an external device connected with the electronic device 100 through the communicator 130 and acquire the sentence. In addition, through the aforementioned process, the processor 120 may acquire an output sentence which translated the input sentence based on the acquired input sentence. When an output sentence is acquired, the processor 120 may control the communicator 130 to transmit the output sentence which translated the input sentence to the external device.

The inputter 140 includes circuitry, and the processor 120 may receive a user instruction for controlling the operations of the electronic device 100 through the inputter 140. Also, the processor 120 may acquire an input sentence in the first language, i.e., the first sentence based on various user inputs.

Specifically, the inputter 140 may be implemented in the form of being included in a display as a touch screen. Also, the processor 120 may receive a user input of touching a user interface (UI) displayed on a display, and acquire the first sentence which is an input sentence in the first language based on the received user input.

Meanwhile, the inputter 140 may include a microphone, and the processor 120 may receive a user voice through the microphone. Also, when a user voice is received, the processor 120 may input the user voice into an artificial intelligence model for voice recognition and acquire a text corresponding to the received user voice, i.e., the first sentence which is an input sentence in the first language.

The outputter 150 includes circuitry, and the processor 120 may output various functions that the electronic device 100 can perform through the outputter 150. Also, the outputter 150 may include a display 151 and a speaker 152, etc.

Specifically, the processor 120 may control the display to display the acquired first sentence in the first language. Also, when a third sentence in the second language is acquired through a translation model trained to translate the first language into the second language, the processor 120 may control the display to display the acquired third sentence in the second language. Also, when a second sentence in the first language is acquired through a conversion model trained to acquire another sentence having similarity greater than or equal to a threshold value to an input sentence, the processor 120 may control the display to display the acquired second sentence.

Meanwhile, when a third sentence in the second language is acquired through a translation model trained to translate the first language into the second language, the processor 120 may input the acquired third sentence into an artificial intelligence model for voice synthesis and acquire a voice corresponding to the third sentence, and output the voice corresponding to the third sentence through a speaker.

According to an embodiment of the disclosure as described above, by correcting an input sentence to a sentence familiar to a learning corpus used for learning of an artificial intelligence model before inputting the input sentence into the artificial intelligence model for machine translation, and then inputting the corrected input sentence into the artificial intelligence model, the translation quality of an output sentence can be improved.

Figure 8:
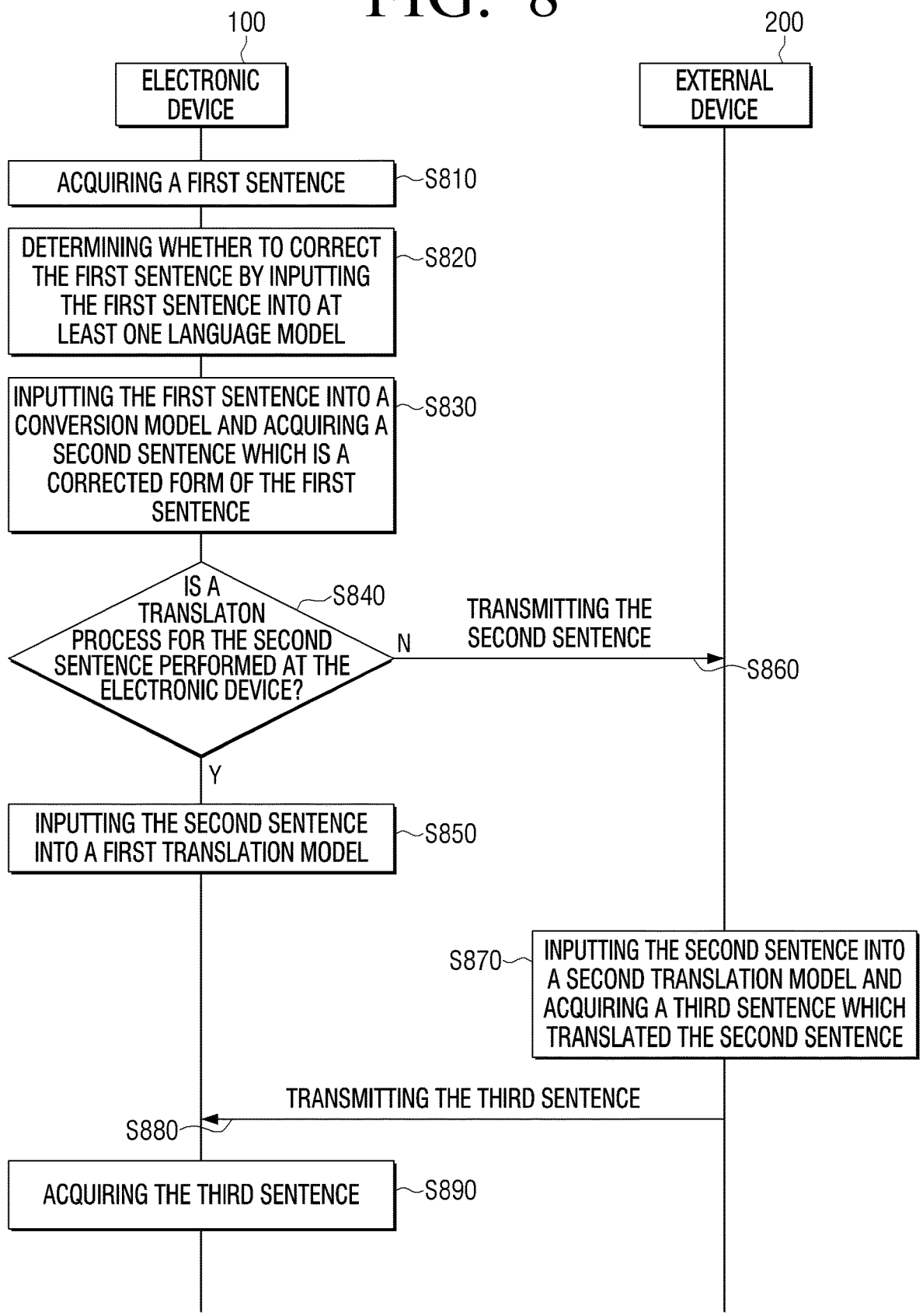
FIG. 8 is a sequence diagram for illustrating an embodiment wherein at least some of controlling processes are performed by an external device connected with an electronic device according to an embodiment of the disclosure.

FIG. 8 is a sequence diagram for illustrating an embodiment wherein at least some of controlling processes according to the disclosure are performed by an external device connected with the electronic device according to an embodiment of the disclosure.

That is, explanation was made based on the premise that all controlling processes according to the disclosure are performed by the electronic device 100, but at least some of a process of determining whether to correct an input sentence, a process of correcting the input sentence, and a process of acquiring an output sentence which translated the input sentence may be performed by the external device 200 connected with the electronic device 100. Hereinafter, in explaining an embodiment of the disclosure with reference to FIG. 8, explanation overlapping with the contents described above in the explanation regarding FIGS. 1 to 7B will be omitted.

Referring to FIG. 8, the electronic device 100 may acquire a first sentence, at operation S810. When a first sentence is acquired, the electronic device 100 may input the first sentence into a first language model and a second language model and determine whether to correct the first sentence, at operation S820. If it is determined to correct the first sentence, the electronic device 100 may input the first sentence into a conversion model and acquire a second sentence which is a corrected form of the first sentence, at operation S830.

Meanwhile, the electronic device 100 may determine whether to perform a translation process for the acquired second sentence at the electronic device 100, at operation S840. Specifically, the electronic device 100 may determine a translation model to perform a translation process for the second sentence between a first translation model included in the electronic device 100 and a second translation model included in the external device 200. Here, a translation model to perform a translation process for the second sentence may be determined by comparing the performances of the first translation model and the second translation model, the processing speeds in the cases of performing a translation process through the first translation model and the second translation model, etc.

If it is determined to perform a translation process for the second sentence at the electronic device 100, at operation S840-Y, the electronic device 100 may input the acquired second sentence into the first translation model, at operation S850, and acquire a third sentence which translated the second sentence, at operation S890.

Meanwhile, if it is determined to perform a translation process for the second sentence at the external device 200, at operation S840-Y, the electronic device 100 may transmit the acquired second sentence to the external device 200, at operation S860. Also, the external device 200 may input the second sentence received from the electronic device 100 into the second translation model and acquire a third sentence which translated the second sentence, at operation S870, and transmit the acquired third sentence to the electronic device 100, at operation S880. Then, the electronic device 100 may receive the third sentence from the external device 200 and thereby acquire the third sentence, at operation S890.

For example, in case the electronic device 100 is implemented as a smartphone, and the external device 200 is implemented as a server, and the performance of the second translation model included in the external device 200 is higher compared to the first translation model included in the electronic device 100 as an on-device, the electronic device 100 may determine to perform the translation process for the acquired second sentence at the external device 200, and acquire a third sentence which translated the second sentence through the external device 200.

Meanwhile, so far, an embodiment based on the premise that a process of acquiring an output sentence which translated an input sentence can be performed by the external device 200 was described with reference to FIG. 8. However, other than the process, at least some of the processes according to the various embodiments of the disclosure such as the process of determining whether to correct an input sentence and the process of correcting an input sentence can also be obviously performed through the external device 200.

Meanwhile, so far, explanation was made based on the premise that the first language model, the second language model, the conversion model, and the translation model are respectively implemented as separate independent artificial intelligence models. However, this is just for clearly explaining the operation of each artificial intelligence model, and the disclosure is not limited thereto. That is, at least two of the first language model, the second language model, the conversion model, and the translation model according to the disclosure may be implemented as one integrated artificial intelligence model.

Specifically, the first language model, the second language model, and the conversion model according to the disclosure may be implemented as one integrated artificial intelligence model, and only the translation model may be implemented as a separate independent artificial intelligence model. That is, when the first sentence is acquired, the electronic device 100 may input the first sentence into an artificial intelligence model wherein the first language model, the second language model, and the conversion model are integrated as one, and acquire a second sentence which is a corrected form of the first sentence. Then, when a second sentence is acquired, the electronic device 100 may input the second sentence into a translation model, and acquire a third sentence which translated the second sentence.

Meanwhile, all of the first language model, the second language model, the conversion model, and the translation model according to the disclosure may be implemented as one integrated artificial intelligence model. That is, the process of determining whether to correct an input sentence, the process of correcting the input sentence to a sentence familiar to a parallel corpus in case it is determined to correct the input sentence, and the process of acquiring an output sentence by translating the corrected input sentence as described above may be performed integrally based on an artificial intelligence model wherein all of the first language model, the second language model, the conversion model, and the translation model are integrated.

In particular, by changing the structure of the front end of the encoder such that an encoder output of the translation model is output to be close to a feature vector space of a parallel corpus, an artificial intelligence model wherein the conversion model and the translation model are integrated may be implemented. Accordingly, in case an input sentence not included in a parallel corpus is input, an encoder output which is the same as a case wherein an input sentence included in a parallel corpus is input may be acquired.

Meanwhile, although not illustrated, the disclosure can obviously be applied to a case wherein the first language model and the second language model are implemented as one integrated artificial intelligence model, and the conversion model and the translation model are implemented as one integrated artificial intelligence model.

Meanwhile, the entire pipelines or some pipelines of various types of integrated artificial intelligence models as described above may be trained through various known learning methods.

Meanwhile, the aforementioned controlling method of the electronic device 100 may be implemented as a program and provided to the electronic device 100. In particular, a program including the controlling method of the electronic device 100 may be provided while being stored in a non-transitory computer readable medium.

Specifically, in a computer readable recording medium including a program executing a controlling method of the electronic device 100, the controlling method of the electronic device 100 includes the operations of, based on acquiring a first sentence in a first language, determining whether to correct the first sentence to another sentence in the first language by using a language model trained based on a learning corpus, and based on determining to correct the first sentence to another sentence in the first language, inputting the first sentence into a conversion model trained to acquire another sentence having similarity greater than or equal to a threshold value to an input sentence and acquiring a second sentence in the first language which is a corrected form of the first sentence, and based on acquiring the second sentence, inputting the second sentence into a translation model trained based on the learning corpus and acquiring a third sentence in the second language.

Here, a non-transitory computer readable medium means a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a compact disc (CD), a digital versatile disc (DVD), a hard disk, a blue-ray disk, a universal serial bus (USB), a memory card, an ROM and the like.

So far, a computer readable recording medium including a program executing a controlling method of the electronic device 100 was schematically described, but this is just for omitting overlapping explanation, and the various embodiments regarding the controlling method of the electronic device 100 can obviously be applied to a computer readable recording medium including a program executing a controlling method of the electronic device 100.

According to an embodiment of the disclosure as described above, by correcting an input sentence to a sentence familiar to a learning corpus used for learning of an artificial intelligence model before inputting the input sentence into the artificial intelligence model for machine translation, and then inputting the corrected input sentence into the artificial intelligence model, the translation quality of an output sentence can be improved.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a microphone;
   a processor; and
   a memory storing instructions, a first language model trained based on a parallel corpus among a learning corpus, a second language model trained based on a mono corpus among the learning corpus, a conversion model trained to acquire a sentence having a similarity greater than or equal to a threshold value to an input sentence, and a translation model trained based on the learning corpus,
   wherein the instructions, when executed by the processor, cause the processor to:
   acquire a first sentence in a first language through the microphone,
   based on acquiring the first sentence in the first language, determine whether the first sentence is more familiar to the parallel corpus or the mono corpus by using the first language model and the second language model,
   based on determining that the first sentence is more familiar to the mono corpus than the parallel corpus, determine to correct the first sentence,
   based on determining to correct the first sentence in the first language, acquire a second sentence in the first language which is a corrected form of the first sentence by inputting the first sentence into the conversion model,
   based on the acquiring of the second sentence, acquire a third sentence in a second language by inputting the second sentence into the translation model, and
   based on determining not to correct the first sentence in the first language, acquire the third sentence in the second language by inputting the first sentence into the translation model without correcting the first language,
   wherein the translation model comprises an artificial intelligence model, and
   wherein, by determining whether to correct the first sentence to another sentence, which is a sentence familiar to the learning corpus used for learning of the artificial intelligence model, before being input into the artificial intelligence model for machine translation, translation quality increases.

2. The electronic device of claim 1, wherein the instructions, when executed by the processor, further cause the processor to:
   based on determining to correct the first sentence to the second sentence in the first language, input the first sentence and the threshold value, which is related to a similarity to the first sentence, into the conversion model, and
   acquire the second sentence having a similarity greater than or equal to the threshold value to the first sentence.

3. The electronic device of claim 1, wherein at least two language models, the conversion model, or the translation model are included in one integrated artificial intelligence model.

4. The electronic device of claim 1, further comprising:
   a communicator including circuitry,
   wherein the instructions, when executed by the processor, further cause the processor to:
   receive the first sentence from an external device connected with the electronic device through the communicator,
   acquire the third sentence, and
   based on the acquiring of the third sentence, control the communicator to transmit the third sentence to the external device.

5. An electronic device comprising:
   a microphone;
   a processor; and
   a memory storing instructions, a first language model trained based on a parallel corpus among a learning corpus, a second language model trained based on a mono corpus among the learning corpus, a conversion model trained to acquire a sentence having a similarity greater than or equal to a threshold value to an input sentence, and a translation model trained based on the learning corpus,
   wherein the instructions, when executed by the processor, cause the processor to:
   acquire a first sentence in a first language through the microphone, input the first sentence into each in the first language model and the second language model,
acquire a first perplexity value for the first language model and a second perplexity value for the second language model,
determine whether to correct the first sentence to a second sentence in the first language based on the first perplexity value and the second perplexity value,
based on determining to correct the first sentence, acquire the second sentence in the first language which is a corrected form of the first sentence by inputting the first sentence into the conversion model, and
based on the acquiring of the second sentence, acquire a third sentence in a second language by inputting the second sentence into the translation model,
wherein the translation model comprises an artificial intelligence model, and
wherein, by determining whether to correct the first sentence to another sentence, which is a sentence familiar to the learning corpus used for learning of the artificial intelligence model, before being input into the artificial intelligence model for machine translation, translation quality increases.

6. The electronic device of claim 5, wherein the instructions, when executed by the processor, further cause the processor to:
based on the first perplexity value being greater than a predetermined first threshold value and the second perplexity value being lesser than a predetermined second threshold value, determine to correct the first sentence to the second sentence in the first language.

7. The electronic device of claim 5, wherein the conversion model is trained based on a similarity between a plurality of sentences included in the mono corpus and a plurality of sentences included in the parallel corpus.

8. The electronic device of claim 5, wherein the conversion model is trained based on a similarity between a plurality of sentences in the first language included in the mono corpus and a plurality of sentences in the first language included in the parallel corpus for translating the second language into the first language.

9. The electronic device of claim 5, wherein the conversion model is trained based on a similarity among a plurality of sentences in the second language included in the parallel corpus for translating the first language into the second language.

10. The electronic device of claim 5, wherein the instructions, when executed by the processor, further cause the processor to:
based on the first perplexity value being lesser than a predetermined first threshold value or based on the second perplexity value being greater than a predetermined second threshold value, determine to not correct the first sentence to the second sentence in the first language, and
based on determining to not correct the first sentence to the second sentence in the first language, input the first sentence into the translation model and acquire the third sentence in the second language.

11. A method of an electronic device, the method comprising:
acquiring, by a processor of the electronic device, a first sentence in a first language through a microphone of the electronic device;
based on acquiring the first sentence in the first language, determining, by the processor, whether the first sentence is more familiar to a parallel corpus or a mono corpus by using a first language model trained based on the parallel corpus among a learning corpus and a second language model trained based on the mono corpus among the learning corpus;
based on determining that the first sentence is more familiar to the mono corpus than the parallel corpus, determining, by the processor, to correct the first sentence;
based on the processor determining to correct the first sentence in the first language, inputting, by the processor, the first sentence into a conversion model trained to acquire another sentence having a similarity greater than or equal to a threshold value to an input sentence and acquiring, by the processor, a second sentence in the first language which is a corrected form of the first sentence;
based on the processor acquiring the second sentence, inputting, by the processor, the second sentence into a translation model trained based on the learning corpus and acquiring, by the processor, a third sentence in a second language; and
based on the processor determining not to correct the first sentence in the first language, inputting, by the processor, the first sentence into the translation model without correcting the first language and acquiring, by the processor, the third sentence in the second language,
wherein the translation model comprises an artificial intelligence model, and
wherein, by determining whether to correct the first sentence to another sentence, which is a sentence familiar to the learning corpus used for learning of the artificial intelligence model, before being input into the artificial intelligence model for machine translation, translation quality increases.

12. The method of claim 11, wherein the acquiring of the second sentence comprises:
based on determining to correct the first sentence to the second sentence in the first language, inputting, by the processor, the first sentence and the threshold value related to similarity to the first sentence into the conversion model and acquiring, by the processor, the second sentence having a similarity greater than or equal to the threshold value to the first sentence.

13. The method of claim 11, wherein at least two language models, the conversion model, or the translation model are included in one integrated artificial intelligence model.

14. A method of an electronic device, the method comprising:
acquiring, by a processor of the electronic device, a first sentence in a first language through a microphone of the electronic device;
inputting, by the processor, the first sentence into each of a first language model trained based on a parallel corpus among a learning corpus and a second language model trained based on a mono corpus among the learning corpus;
acquiring, by the processor, a first perplexity value for the first language model and a second perplexity value for the second language model;
based on the first perplexity value and the second perplexity value, determining, by the processor, whether to correct the first sentence to a second sentence in the first language;

based on the processor determining to correct the first sentence, inputting, by the processor, the first sentence into a conversion model trained to acquire another sentence having a similarity greater than or equal to a threshold value to an input sentence and acquiring, by the processor, the second sentence in the first language which is a corrected form of the first sentence; and based on the processor acquiring the second sentence, inputting, by the processor, the second sentence into a translation model trained based on the learning corpus and acquiring, by the processor, a third sentence in a second language by the processor, wherein the translation model comprises an artificial intelligence model, and wherein, by determining whether to correct the first sentence to another sentence, which is a sentence familiar to the learning corpus used for learning of the artificial intelligence model, before being input into the artificial intelligence model for machine translation, translation quality increases.

15. The method of claim 14, wherein the determining of whether to correct the first sentence to the second sentence comprises:

based on the first perplexity value being greater than a predetermined first threshold value and the second perplexity value being lesser than a predetermined second threshold value, determining, by the processor, to correct the first sentence to the second sentence in the first language.

16. The method of claim 14, wherein the conversion model is trained based on a similarity between a plurality of sentences included in the mono corpus and a plurality of sentences included in the parallel corpus.

17. The method of claim 14, wherein the conversion model is trained based on a similarity between a plurality of sentences in the first language included in the mono corpus and a plurality of sentences in the first language included in the parallel corpus for translating the second language into the first language.

18. The method of claim 14, wherein the conversion model is trained based on a similarity among a plurality of sentences in the second language included in the parallel corpus for translating the first language into the second language.

19. The method of claim 14, wherein the determining of whether to correct the first sentence to the second sentence comprises, based on the first perplexity value being lesser than a predetermined first threshold value or the second perplexity value being greater than a predetermined second threshold value, determining, by the processor, to not correct the first sentence to the second sentence in the first language, and wherein the acquiring of the third sentence comprises, based on determining to not correct the first sentence to the second sentence in the first language, inputting, by the processor, the first sentence into the translation model and acquiring, by the processor, the third sentence in the second language.

20. A non-transitory computer readable recording medium including a program having instructions which, when executed by a processor of an electronic device, cause the processor to perform a method comprising:

acquiring, by the processor of the electronic device, a first sentence in a first language through a microphone of the electronic device;

based on acquiring the first sentence in the first language, determining, by the processor, whether the first sentence is more familiar to a parallel corpus or a mono corpus by using a first language model trained based on the parallel corpus among a learning corpus and a second language model trained based on the mono corpus among the learning corpus;

based on determining that the first sentence is more familiar to the mono corpus than the parallel corpus, determining, by the processor, to correct the first sentence;

based on the processor determining to correct the first sentence in the first language, inputting, by the processor, the first sentence into a conversion model trained to acquire another sentence having a similarity greater than or equal to a threshold value to an input sentence and acquiring, by the processor, a second sentence in the first language which is a corrected form of the first sentence;

based on the processor acquiring the second sentence, inputting, by the processor, the second sentence into a translation model trained based on the learning corpus and acquiring, by the processor, a third sentence in a second language; and based on the processor determining not to correct the first sentence in the first language, inputting, by the processor, the first sentence into the translation model without correcting the first language and acquiring, by the processor, the third sentence in the second language, wherein the translation model comprises an artificial intelligence model, and wherein, by determining whether to correct the first sentence to another sentence, which is a sentence familiar to the learning corpus used for learning of the artificial intelligence model, before being input into the artificial intelligence model for machine translation, translation quality increases.

* * * * *